May 24, 1949.  H. H. HULL  2,470,820
ELECTRIC STEERING CONTROL
Filed June 15, 1945
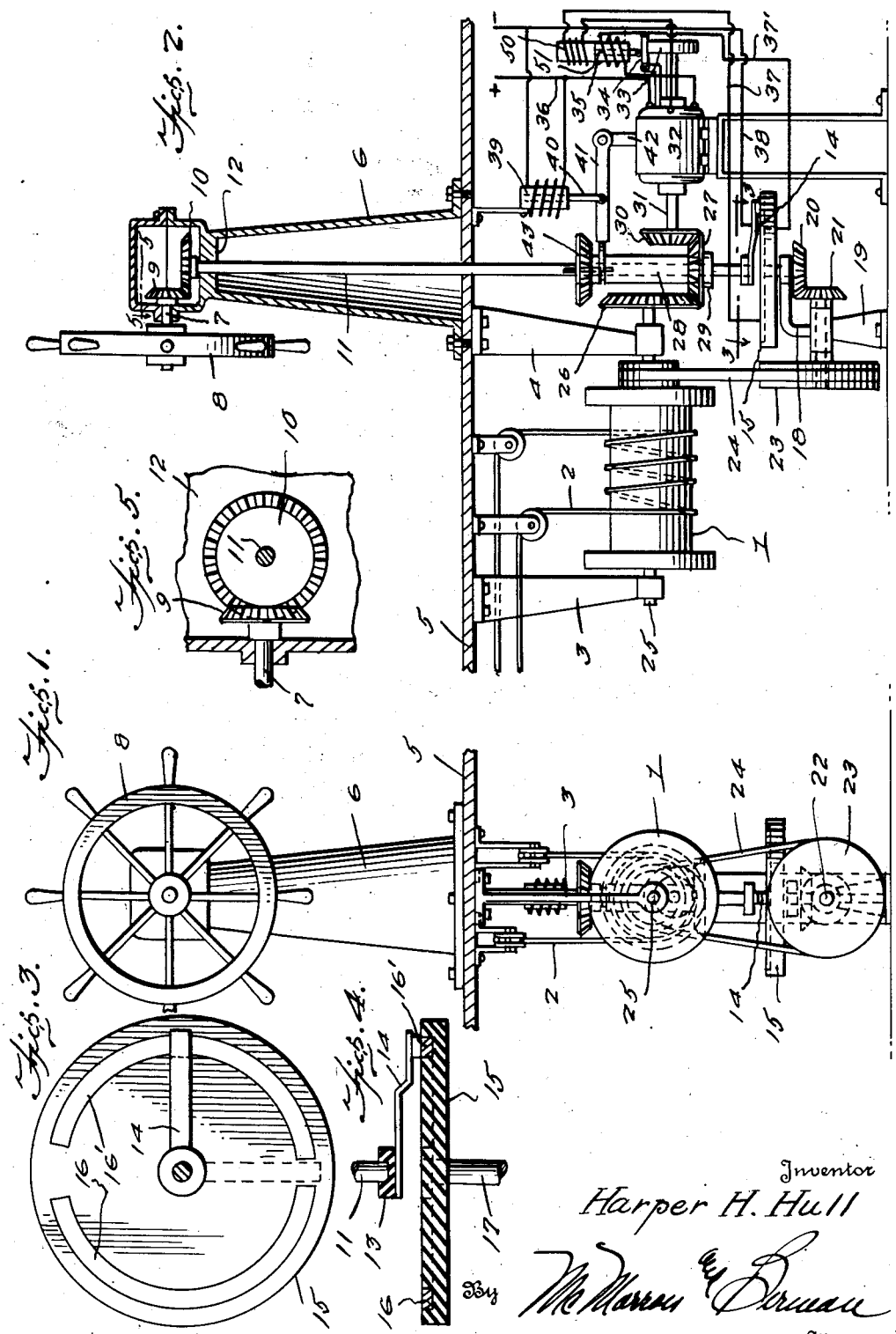
Inventor
Harper H. Hull Patented May 24, 1949

2,470,820

UNITED STATES PATENT OFFICE 2,470,820

ELECTRIC STEERING CONTROL

Harper H. Hull, Birmingham, Ala.

Application June 15, 1945, Serial No. 599,707

2 Claims. (Cl. 318—2)

This invention relates to control systems for electric motors, and more particularly to control systems for electric motors that are employed for operating the steering mechanism of ships.

A main object of the invention is to provide an improved control system by means of which the amount and direction of movement of motor-operated steering devices for ships may be accurately predetermined and governed.

A further object of the invention is to provide a means for establishing manual control of the steering mechanism of a ship upon failure of the power supply for the motor means thereof.

Further objects and advantages of the invention will appear from the following description and claims, and from the accompanying drawings, wherein:

Figure 1 is a front elevational view of an improved steering control structure for a ship in accordance with this invention.

Figure 2 is a side elevational view partly in section of steering structure of Figure 1.

Figure 3 is a cross-sectional view taken on line 3—3 of Figure 2.

Figure 4 is a cross-sectional view of the contact plate employed in the control structure of Figure 1 showing the contact arm in position thereon.

Figure 5 is a cross-sectional view taken on line 5—5 of Figure 2.

Referring to the drawings, 1 designates a steering drum upon which is wound a steering cable 2 the ends of which are connected over suitable pulleys to the rudder quadrant of a ship. Steering drum 1 is journaled in hanger bearing members 3 and 4 suspended from deck 5.

Mounted on deck 5 is a housing 6 in the upper portion of which is journaled a horizontal shaft 7 carrying a steering wheel 8 secured to its outer portion. Secured to the inner portion of shaft 7 is a bevel gear 9 which meshes with a bevel gear 10 carried by the upper end of a vertical shaft 11 rotatively supported by an appropriate thrust bearing on a horizontal partition wall 12, provided in the upper portion of housing 6. Vertical shaft 11 extends downwardly through deck 5 and carries at its lower end an insulating block 13 to which is secured a contact arm 14. The free end of contact arm 14 bears on a horizontal contact plate 15 comprising a disc-shaped body portion of insulating material provided with a pair of arcuate metal contact strips 16, 16' embedded therein, the ends of strips 16, 16' being separated by a gap which is slightly wider than the width of contact arm 14. Contact plate 15 is mounted on a vertical shaft 17 which is journaled in a stationary bracket 18 forming part of a bearing member 19. The lower end of shaft 17 carries a bevel gear 20 which meshes with a bevel gear 21 carried on a horizontal shaft 22 journaled in bearing member 19. The outer end of shaft 22 carries a pulley 23 which is connected by a belt 24 to drum 1.

Drum 1 is rigidly mounted on a horizontal shaft 25 rotatively supported in bearing members 3 and 4 and provided with an inwardly projecting portion carrying a bevel gear 26. Bevel gear 26 normally meshes with a horizontal idler bevel gear 27 mounted for free rotation on a sleeve member 28 which is provided with a lower integral bearing flange 29 providing a bottom support for idler gear 27. Normally meshing with idler gear 27 is a bevel gear 30 carried on the armature shaft 31 of a direct current motor 32. Armature shaft 31 extends outwardly on the opposite side of motor 32 and carries a brake disc 33 which is adapted to be engaged by a downwardly biased brake member 34 connected to the plunger of a brake solenoid 35.

Solenoid 35 is provided with two windings 50 and 51, each adapted to maintain member 34 out of braking engagement with disc 33 when energized.

Motor 32 is provided with three terminals. One terminal is connected to the positive supply wire 36. Of the other two terminals, one is connected through winding 50 to a conductor 37 which is in turn connected to contact strip 16 and the other is connected through winding 51 to a conductor 37' which in turn is connected to contact strips 16'.

The negative supply wire 38 is connected to contact arm 14. The motor 32 is provided with two sets of appropriately wound field and armature coils, one set being connected through winding 50 to conductor 37 and the other set being connected through winding 51 to conductor 37', each set having a common connection to conductor 36. Thus, when contact arm 14 contacts strip 16 a circuit will be established from supply wire 38 through strip 16, winding 50 and conductor 37 to energize the motor for rotation of its armature in a first direction and when contact arm 14 contacts strip 16' a circuit will be established from supply wire 38 through strip 16', winding 51 and conductor 37', to energize the motor for rotation of its armature in the opposite direction.

It will be apparent that the motor will become deenergized when contact arm 14 is positioned in the gap between the ends of contact strips 16 and 16'. Thus, assuming that this is the starting position, as represented by the dotted position of said arm in Figure 3, when steering wheel 8 is turned to a position corresponding to a desired angle of movement of the rudder, contact arm 14 is moved onto a strip 16 or 16' to a corresponding angular position with respect to said gap on disc 15. Motor 32 will be thereby energized to produce rotation of drum shaft 25 and movement of cable 2 in the desired direction, and this will continue until disc 15 has been rotated by belt 24 and gears 21 and 20 into a position where contact arm 14 is in the gap between strips 16 and 16'. The motor circuit is thus opened and the rudder remains in its rotated position until steering wheel 8 is again actuated.

Sleeve 28 which rotatively carries idler gear 27 adjacent its lower end is keyed to shaft 11 for slidable axial movement thereon and is normally maintained in raised position with idler gear 27 in meshing engagement between bevel gears 26 and 30 by a magnetic clutch comprising a solenoid 39 connected across the supply line provided with a plunger 40 pivotally connected to a lever 41 which in turn is pivotally connected to a stationary support 42 at one end thereof and which is formed with finger members engaging a groove in sleeve 28 at the other end. Sleeve 28 is formed at its top end with a bevel gear 43. When the power supply fails, solenoid 39 becomes deenergized and arm 41 drops, allowing sleeve 28 to move downwardly. This disengages idler gear 27 from gears 26 and 30 and engages gear 43 with gear 26. Drum 1 may then be operated manually by rotation of steering wheel 8.

While a specific embodiment of a control system for a steering mechanism has been disclosed in the foregoing description, it will be understood that various modifications within the spirit of the invention may occur to those skilled in the art. Therefore it is intended that no limitations be placed on the invention other than as defined by the scope of the appended claims.

What is claimed is:

1. In a steering gear for ships, comprising a rudder-operating drum having a rotatably-mounted shaft fixed thereto, an electric motor having a rotatable armature shaft and three connections among which one serves for operation of said armature shaft in either direction and the other two for selective operation in either direction, an upright hollow support, a manually-operated tiller having a tiller shaft extending into the upper portion of the hollow support, a gear within the latter fixed on the inner end of the tiller shaft, an interior bearing within the hollow support, and a depending shaft extending rotatably through the interior bearing and carrying a gear upon the upper end thereof above said bearing which meshes with the first-mentioned gear, the features which include a drive gear on one end of the motor armature shaft, a relatively larger gear fixed on one end of the drum shaft, a slidable sleeve mounted for positive rotation upon the depending shaft and having an annular engagement portion thereon, a gear fixed upon the lower portion of the sleeve adapted in raised position of the latter to mesh with the drive gear and the relatively larger gear, a further gear fixed upon the upper end of said sleeve and meshing with said larger gear alone in lowered position of said sleeve while the gear at the lower end of the latter idles, a movable sleeve-shifting member pivotally supported at one end below said hollow support and at the other end engaging with the annular engagement portion upon said sleeve for raising the member when actuated, electrically-operated means connected to the latter to raise the same when energized, a contact arm fixed upon the lower end of said depending shaft below said sleeve, a pulley on the drum shaft, a bearing stationary below the latter shaft and the drum, a horizontal shaft rotatably mounted in the latter bearing carrying a pulley on one end and a gear on the other end, a further bearing rigidly fixed in right-angled relation to said latter bearing and in line with and below said depending shaft, a further shaft rotatably mounted in said further bearing and carrying a gear upon the lower end meshing with the last-mentioned gear and a disc upon the upper end thereof, a belt connecting the two pulleys, and a pair of insulated commutating contacts fixed on the disc in position to be selectively brought under the contact arm and having insulated gaps between the ends thereof, said contact arm being connected to the first-mentioned connection of the motor and said pair of contacts being individually connected to said other two connections of said motor, and there being means for bringing electric current to said motor and contacts.

2. In a steering gear for ships, comprising a rudder-operating drum having a rotatably mounted shaft fixed thereto, an electric motor having a rotatable armature shaft and three connections among which one serves for operation of said armature shaft in either direction and the other two for selective operation in either direction, an upright hollow support, a manually-operated tiller having a tiller shaft extending into the upper portion of the hollow support, a gear within the latter fixed on the inner end of the tiller shaft, an interior bearing within the hollow support, and a depending shaft extending rotatably through the interior bearing and carrying a gear upon the upper end thereof above said bearing which meshes with the first-mentioned gear, the features which include a drive gear on one end of the motor armature shaft, a relatively larger gear fixed on one end of the drum shaft, a slidable sleeve mounted for positive rotation upon the depending shaft and having an annular engagement portion thereon, a gear fixed upon the lower portion of the sleeve adapted in raised position of the latter to mesh with the drive gear and the relatively larger gear, a further gear fixed upon the upper end of said sleeve and meshing with said larger gear alone in lowered position of said sleeve while the gear at the lower end of the latter idles, a movable sleeve-shifting member pivotally supported at one end below said hollow support and at the other end engaging with the annular engagement portion upon said sleeve for raising the latter when actuated, a solenoid fixed above the sleeve-shifting member having a plunger connected at the lower end thereof to an intermediate portion of said sleeve-shifting member to raise the latter when the solenoid is energized, a brake disc fixed on the other end of said armature shaft, a brake member pivotally mounted adjacent to the motor and biased into contact with said brake disc, a second solenoid stationary above the latter having a plunger connected to said brake member for raising the latter and freeing said brake disc when said second solenoid is energized, both solenoids being connected to the motor circuit, a contact arm fixed upon the lower end of said depending shaft below said sleeve, a pulley on the drum shaft, a bearing stationary below the latter shaft and the drum, a horizontal shaft rotatably mounted in the latter bearing carrying a pulley on one end and a gear on the other end, a further bearing rigidly fixed in right-angled relation to said latter bearing and in line with and below said depending shaft, a further shaft rotatably mounted in said further bearing and carrying a gear upon the lower end meshing with the last-mentioned gear and a disk upon the upper end thereof, a belt connecting the two pulleys, and a pair of insulated commutating contacts fixed on the disc in position to be selectively brought under the contact arm and having insulated gaps between the ends thereof, said contact arm being connected to the first-mentioned connection of the motor and said pair of contacts being individually connected to said other two connections of said motor, and there being means for bringing electric current to said motor and solenoids.

HARPER H. HULL.

REFERENCES CITED

The following references are of record in the file of this patent:

UNITED STATES PATENTS

| Number | Name | Date |
| --- | --- | --- |
| 2,018,761 | Hodgman | Oct. 29, 1935 |
| 2,045,775 | Hodgman | June 30, 1936 |
| 2,428,606 | Baak | Oct. 7, 1947 |